Patented Mar. 11, 1941

2,234,734

UNITED STATES PATENT OFFICE 2,234,734

INCORPORATING WATER-REPELLENT PIGMENTS IN VISCOSE

Hayden B. Kline, Cleveland, Ohio, assignor to Industrial Rayon Corporation, Cleveland, Ohio, a corporation of Delaware No Drawing. Application July 13, 1937, Serial No. 153,379

1 Claim. (Cl. 106—40)

This application, which is a continuation in part of abandoned application Serial No. 4,693, filed February 2, 1935, for "Manufacture of colored artificial silk," relates to the incorporation of water-repellent pigments in viscose.

It has been customary in the manufacture of viscose containing one or more readily compatible pigments to incorporate the pigment or pigments at or soon after the time of the preparation of the viscose. Thus it has been the practice to mix in a dissolver cellulose xanthate, caustic soda, water, and the desired pigment or pigments. Sometimes all of the water has been added with the caustic soda, the latter being in such case in the form of an aqueous solution; but more often part of the water has been added with the caustic soda and part with the pigment or pigments. In a great many cases this practice of introducing one or more pigments comparatively early in the ageing schedule has tended to interfere with the ageing of the viscose, an operation which has been invariably carried out heretofore at substantially the concentration employed in spinning.

To obviate this difficulty, it has been proposed to prepare viscose of the usual spinning concentration; to filter, age, deaerate and otherwise treat the viscose in exactly the same manner as viscose used in the manufacture of unpigmented products; and to introduce the pigment or pigments after the viscose is no longer in bulk but is actually in passage to the spinning machine. An important objection to this process is that it is impossible to obtain uniform dissemination of the pigment or pigments, however readily compatible with the viscose, in the few seconds that intervene prior to the time of spinning. Another important disadvantage is that if the pigment is to any extent water-repellent it is impossible to avoid the necessity of dispersing the pigment in a large quantity of water the presence of which, by modifying such important factors as the concentration of the solution, make satisfactory spinning impossible.

The present invention, which relates to the incorporation in viscose of water-repellent pigments, departs from these and other known practices in that it does not contemplate the initial preparation of viscose of approximately the concentration employed in spinning; rather, the invention provides a process pursuant to which the viscose is made up in a concentration substantially higher than that desired for or useful in spinning. This is accomplished by withholding a substantial part, say 10%, of the water employed in the preparation of the viscose. Being thus of a concentration substantially higher than that suitable for spinning, the viscose is treated after the manner of ordinary viscose to prepare it for spinning, as, for example, by filtering, ageing, and deaerating it. The water which has been withheld is subsequently incorporated in conjunction with and as the vehicle for the introduction of the desired water-repellent pigment or pigments.

The invention thus involves temporarily withholding a portion of the dissolving water, using it later, after substantial completion of the ageing operation, to carry the pigment or pigments into the viscose at the required final concentration. This procedure is based on discoveries as a result of which, by means of a simple but highly significant departure from the usual routine, it is possible to produce pigmented products of exactly the same physical characteristics as unpigmented products; i. e., pigmented products the physical properties of which have not been adversely affected as a result of the use of unduly dilute viscose. The process maintains substantially unchanged the other characteristics of the pigmented product, the manufacturing routine for the preparation of the viscose, and even the spinning operation itself. For practical reasons hereinafter pointed out, this is extremely important to the manufacturer of viscose products.

The making of viscose products involves the preparation at the outset of the viscose from which the products are to be fabricated. The first step in the preparation of viscose consists in steeping sheets of a particularly pure form of cellulose, usually high grade paper pulp, in a solution of caustic soda of carefully controlled concentration, for a precise time and at an exact temperature, all in order that the reaction between the cellulose and the caustic soda may proceed to a predetermined stage. Thereafter, a definite portion of the caustic soda solution is expressed and the sheets are taken immediately to a disintegrating mill where they are broken up into moist crumbs. These crumbs are then stored in a temperature-conditioned room for a specified period of time.

At the close of the storage interval, the crumbs are churned with a predetermined amount of carbon disulphide to produce a compound called "cellulose xanthate.". This intermediate product is dissolved, together with a very carefully proportioned amount of caustic soda, in water, the dissolving step being conducted at a definite temperature for a precise period of time. The resulting viscose is sent to a storage tank system for ageing for a definite period of time determined by the character of the cellulose, the concentration of the original steeping solution, the amount of the caustic soda introduced in the dissolving step, the amount of carbon disulphide used, and the acidity of the coagulating bath. The ageing period is exceedingly critical, a variation of about one hour on a total ageing time of 72 hours being all that is permissible.

During the ageing operation, the viscose is filtered from tme to time to remove undesired reaction products.

After a final filtration, the viscose is sent to the spinning machines, from which it is projected into a coagulating bath. All of the spinning machines must spin at the same time from the same batch of viscose, wherefore the size of each batch of viscose must be such as to provide for all of the spinning machines for a definite time interval. To supply them, successive fresh batches of cellulose must be started through the preliminary steps at about one hour intervals. In order to supply a substantial number of spinning machines, the size of each batch of viscose should be and ordinarily is in the neighborhood of 5000 pounds.

Each plant for the manufacture of viscose products has its own particular schedule of times, temperatures and concentrations for the preparation of the viscose. To such empirically determined schedules found to produce satisfactory products manufacturers adhere with the utmost care, even minor departures from the schedule of temperatures, times and concentrations being scrupulously avoided. Seemingly minor and insignificant departures from the schedule may profoundly alter the results, to the extent, even, of rendering the product utterly useless. It is said that in the manufacture of viscose there are more than a thousand critical variables between the preparation of the raw materials and the completion of the product any one of which, if altered, may result in process failure.

One of these variables is the concentration of the viscose, which throughout the entire process of preparation of the viscose has always heretofore been carefully maintained at a value within a fraction of one per cent of the desired spinning concentration. As hereinabove noted, it has been customary to make up the viscose in the first instance in approximately the concentration desired for spinning, thereafter filtering, ageing and deaerating it. The reason for performing these various steps at substantially the spinning concentration is found in the fact that efforts to spin at concentrations differing by more than a fraction of one per cent from the proper spinning concentration have given rise to frequent process failures. If, for example, the departure from the proper spinning concentration is substantial, the viscose cannot even be spun.

The present invention involves the surprising discovery that there is at least one respect in which the usual manufacturing procedure affords a valuable margin of relative stability; namely, that while all of the other factors must be held carefully at their predetermined values, the solution made by dissolving cellulose xanthate in the presence of caustic soda may be made up with considerably less water than that necessary in the spinning solution without injury to or interference with the ageing process. Up to about 10% of the water may, without disturbing the ageing schedule, be omitted and added at the close of the ageing schedule to produce a spinning solution of the proper character, a range of permissible variation that is probably unique in the process. Most, if not all, of the other items must be maintained with an accuracy of better than about 1%, else the spinning solution is rendered useless.

The present invention thus modifies this highly sensitive procedure at a point at which the unstable character of the viscose has been discovered to be somewhat less pronounced.

It has been thought heretofore that the relationship between the cellulose content of the viscose, the amount of caustic soda, the amount of water, the ageing time, and the concentration of the coagulating bath are strictly interdependent. Such is certainly the fact as regards the amount of caustic soda, but the present invention depends in part upon the discovery that, provided the over-all amount of caustic soda is meanwhile maintained, a considerable amount of the water in which the caustic soda and cellulose xanthate are dissolved may be temporarily withheld. If it is later added at or toward the close of the ageing schedule, a normal viscose of proper concentration for spinning is nevertheless obtained.

That is, even though the amount of water in the viscose is vitally important to satisfactory spinning, it is not necessary, contrary to previous opinions, that all of the water be present in the viscose throughout the ageing procedure.

In practicing the invention, the ordinary steeping, disintegrating, crumb storing and xanthating operations are conducted according to the empirically determined plant schedule, after which the cellulose xanthate is dissolved in the presence of the usual amount of caustic soda in considerably less than the usual amount of water, as much as 10% of the water necessary to make up viscose of proper concentration for spinning being thus withheld. The resulting solution may be utilized for the spinning of a plurality of different products by reducing the initial batch into division batches, each of which, prior to its delivery to the spinning machines, is brought up to proper strength by the addition of its proportionate part of the amount of water so withheld. As already indicated, the step of making up the withheld water may be advantageously employed to carry one or more water-repellent pigments into the viscose.

The addition of the readily compatible pigments ordinarily used for delustering involves at the most the incorporation of but a few pounds of water without any perceptible dilution of the viscose; but the addition of one or more water-repellent pigments, such, for example, as carbon black, is an entirely different matter. Carbon black, because of the existence of a tarry coating on the particles, agglomerates with great readiness into lumps too large to spin successfully. In order to maintain a particle size small enough to permit the carbon black particles to be extruded with the viscose into the coagulating bath, the carbon black must be mixed with a very large quantity of water.

To color a typical five thousand pound batch of viscose with carbon black in a quantity sufficient to produce a satisfactory black product requires that about 60 pounds of carbon black be added to the batch. This amount of carbon black cannot be added dry even to a very large batch, since it is not wetted by the viscose, nor can it satisfactorily be made up in water to a paste of small volume. The carbon black must first be mixed with something less than 500 pounds of water, roughly 60 gallons of water, to maintain the particle size in the viscose. If added to ordinary viscose in the manner heretofore employed, this amount of water, approximately 10% of the volume of the batch, reduces the concentration of the viscose to a point where a satisfactory product cannot possibly be spun.

These difficulties, among others, it is one of the objects of the present invention to obviate.

As an example of the practice of the present invention in the manufacture of viscose products of, say, 6.6% cellulose concentration, it is practicable to make up viscose of 7.5% concentration, the same being prepared by introducing into a dissolver cellulose xanthate, caustic soda and water in quantities sufficient to bring the cellulose concentration to 7.5%. This mixture is then filtered, aged in the usual way, deaerated and otherwise treated quite as would be viscose of 6.6% concentration. Shortly before the viscose is ready for spinning but while the viscose is still in bulk, the desired water-repellent pigment is produced. If, for example, it is desired to manufacture a product colored black by means of carbon black, there is introduced into the viscose an aqueous suspension of carbon black containing the exact amount of water sufficient to reduce the cellulose concentration of the viscose to the desired 6.6%.

Thus the invention comprehends, in its preferred form, the several steps of preparing a batch of viscose of a relatively high concentration; treating it after the manner of viscose of the ordinary kind to prepare it for spinning; introducing the desired water-repellent pigment, simultaneously diluting the batch in conjunction with the addition of the pigment to the proper spinning concentration; and spinning the viscose. The step of withholding part of the water employed in the preparation of the viscose in order to use it in dispersing a water-repellent pigment to be later introduced is highly advantageous in avoiding undue reduction of the cellulose concentration of the viscose.

This and other meritorious features characterize the invention, which is to be understood to be exemplified by rather than limited to the illustrative example above given.

Inasmuch as the pigment, even though water-repellent, is introduced while the viscose is still in bulk, it is obviously possible to obtain a more satisfactory dissemination of the pigment in the viscose than can be accomplished by other methods. The introduction into a given batch of the amount of water previously withheld is conveniently used to facilitate the step of mixing the pigment with the viscose, more especially in that it permits bringing the pigment into the form of a suspension prior to its introduction into the viscose. Withholding the water in the manner herein described has the advantage that it permits of the employment of a minimum of the apparatus, which is an important advantage in view of the fact that filtering, ageing, deaerating and other steps require the employment for relatively long periods of time of large numbers of filter presses, tanks and other items of equipment.

It is possible to apply the invention to advantage in various other processes than the viscose process. Thus, while the invention is preferably employed in the manufacture of viscose products, in which, as stated, water is withheld in order to maintain the cellulose content at a substantially higher concentration than normally would be the case, it is also possible to employ the invention in the cellulose acetate process, withholding part of the acetone or other liquid employed as the solvent. The nitrocellulose and cuprammonium processes may likewise be used, these processes being modified as necessary to permit of the belated introduction of part of the solvent or other liquid vehicle with the pigment or pigments.

It is evident that numerous other modifications and changes may be made in the procedure described in the present application without in any way departing from the spirit of the invention. It will be understood that the term "carbon black" as hereinbefore and hereinafter used is not employed in its strictest sense, but is intended to comprehend the different types of carbon pigments which are commercially available. It will further be understood that as herein employed the term "liquid-repellent" is not to be understood as limited to water, but as equally applicable to other liquids; e. g., the acetone or other solvent employed in the cellulose acetate process.

It is intended that the patent shall cover, by suitable expression in the appended claim, whatever features of patentable novelty reside in the invention.

What is claimed is:

The process of effecting the incorporation of a relatively large quantity of carbon black in viscose for the purpose of imparting a full black color to an extrusion product formed therefrom which process comprises the steps of preparing a concentrated aqueous solution of sodium cellulose xanthate of a consistency so high as to be impracticable for satisfactory spinning even after prolonged ageing; ageing the solution according to the customary ageing schedule without in the meanwhile diluting the solution, as by the addition of water, to a concentration approaching that at which the solution is ultimately to be employed; and, toward the end of the ageing schedule, introducing the desired large quantity of carbon black in the form of a physical suspension thereof in a quantity of water sufficient to reduce the consistency of the solution for the first time from an impracticably high concentration to a concentration practicable for spinning.

HAYDEN B. KLINE.